(12) United States Patent
Steiger

(10) Patent No.: US 6,305,404 B1
(45) Date of Patent: Oct. 23, 2001

(54) DEVICE FOR REGULATING THE CONTENTS OF A CONTAINER

(75) Inventor: Peter Steiger, Schriesheim (DE)

(73) Assignee: Lincoln GmbH, Walldorf (DE)

( * ) Notice: Subject to any disclaimer, the term of this patent is extended or adjusted under 35 U.S.C. 154(b) by 0 days.

(21) Appl. No.: 09/423,008

(22) PCT Filed: Mar. 2, 1999

(86) PCT No.: PCT/EP99/01349

§ 371 Date: Oct. 29, 1999

§ 102(e) Date: Oct. 29, 1999

(87) PCT Pub. No.: WO99/45345

PCT Pub. Date: Sep. 10, 1999

(30) Foreign Application Priority Data

Mar. 6, 1998 (DE) .............................................. 198 09 620

(51) Int. Cl.[7] .............................. B08B 9/087; B08B 9/38; F17D 3/01; G01F 23/00
(52) U.S. Cl. ........................ 137/242; 73/290 R; 137/386; 137/392; 137/558; 222/64
(58) Field of Search ..................................... 137/386, 392, 137/242, 565.01, 554, 558; 73/304 R, 304 C, 301, 64, 290 R; 33/713, 721, 722; 222/64

(56) References Cited

U.S. PATENT DOCUMENTS 5,694,974 * 12/1997 Niemiro et al. ..................... 137/392

FOREIGN PATENT DOCUMENTS

4433170 * 3/1996 (DE) .

* cited by examiner

Primary Examiner—George L. Walton
(74) Attorney, Agent, or Firm—Wenderoth, Lind & Ponack, L.L.P.

(57) ABSTRACT

A device for checking the contents of a container (5) for a supply substance (8) that is not self-leveling. The device includes a stirring blade (2) that is rotatable about an axis of rotation (D) for the delivery of the supply substance (8) to a consumer (21), for example, the suction chamber (2) of a lubricating pump, and for freeing the supply substance (8) of air inclusions, with a mechanism for scraping off the supply substance (8) from the stirring blade (2) and with a measuring unit (22) for measuring the fill level of the supply substance (8) in the container (5). The region of the container bottom (9) has openings (18) for transferring the supply substance (8) in a direction toward the consumer (21) and at least one radial stationary flank (1) is disposed, at least locally, in the region of the container center and is spaced from the container bottom (9) such that the stirring blade (2) can be at least partially rotated under the radial stationary flank.

20 Claims, 1 Drawing Sheet

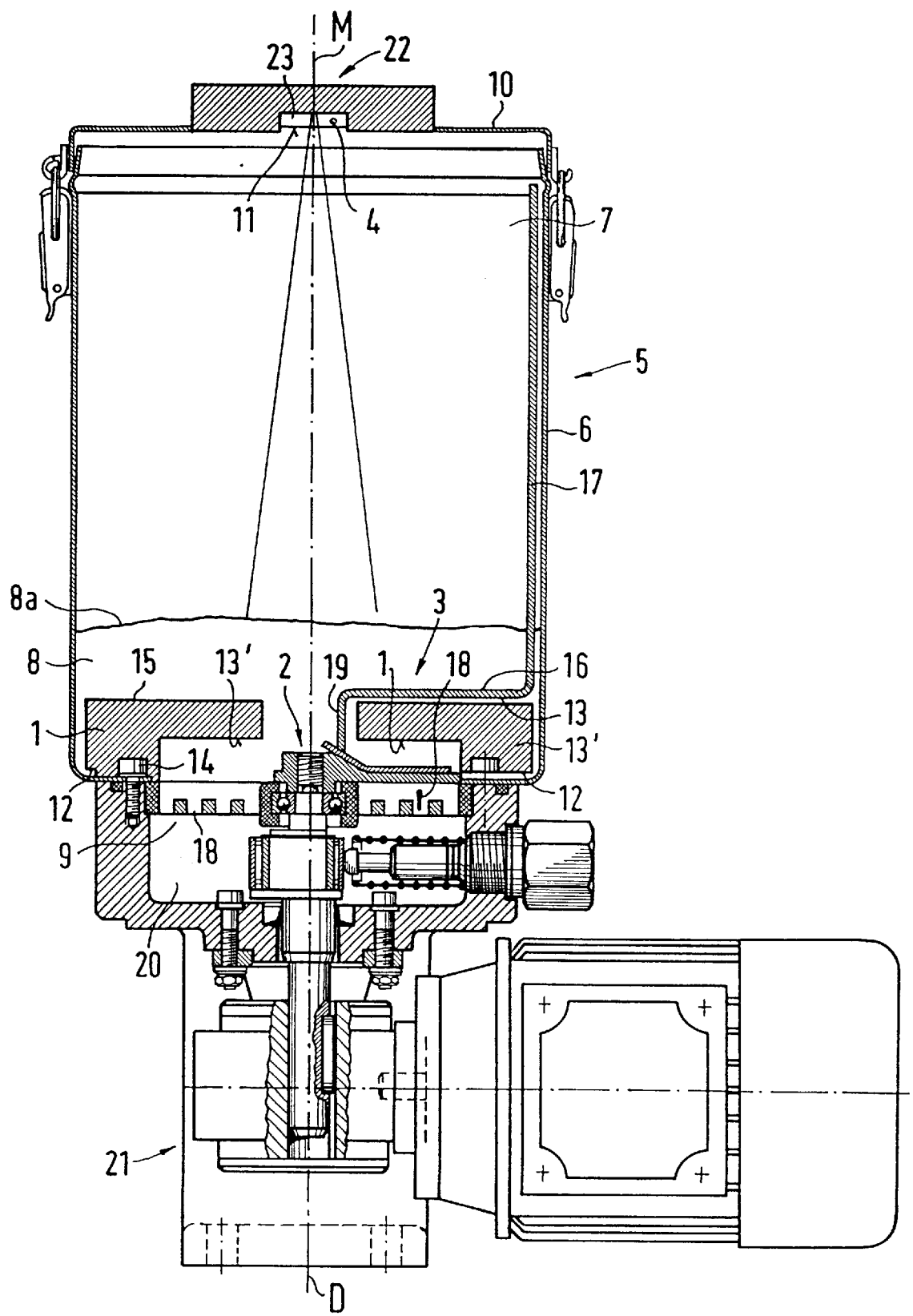

DEVICE FOR REGULATING THE CONTENTS OF A CONTAINER

BACKGROUND OF THE INVENTION

The present invention relates to a device for checking the contents of a container for a non-self-leveling supply substance, such as lubricant, grease or the like. The container includes a stirring blade that is movable about an axis of rotation for delivering the supply substance to a consuming receiver, for example the suction chamber of a lubrication pump, and for freeing the supply substance of air inclusions. If appropriate the container is provided with an associated scraper for scraping the supply substance from the container wall and from the stirring blade. The container is also provided with a measuring unit for measuring the level of the supply substance contained therein.

In checking, in particular of low level monitoring, of the contents of containers for highly viscous supply substances, such as lubricant, grease or the like, such as for example are used in connection with central lubricating pumps, problems arise due to the high rigidity of the supply substances since it no longer behaves in a self-leveling manner. This applies inter alia in particular to greases starting at Class 2 of the consistency classification of the National Lubricating Grease Institute (NLGI) or DIN 51 818. In the case of a supply of these substances, it cannot be readily assumed that a flat surface is present in the container which could serve for measuring the level of fill.

Conventionally a rotating stirring blade is used to free the supply substance of air inclusions and supply the substance to the suction chamber of the receiving device. On the surface of the supply substance, peak and valley-like formations are generated because the rotational movement of the stirring blade always pushes the supply substance ahead of itself. The formation of the peaks and valleys, under some circumstances, may even be augmented through the measures for scraping off the supply substance from the stirring blade. The conditions are similar in the case of a rotating scraper for scraping the supply substance from the container wall. Therefore, the use of measuring units, which are known per se, and rely on the principle of reflection, is not possible. Solutions of this problem by use of a follower plate disposed on the surface of the supply substance for the purpose of leveling it, have the disadvantage that a portion of the useful contents is lost. Furthermore, with such a level-smoothing solutions, the expenditures in terms of construction and the other costs generated thereby are relatively high.

DE 44 33 170 A1 discloses a unit for monitoring low levels in a lubrication supply container. The unit comprises a stirring blade with a holder, pivotably articulated thereon for a position transmitter. The principle of monitoring in this unit is that, by means of a position sensor, the position of the position transmitter is acquired depending on whether or not a direct mechanical reciprocal interaction exists between the position transmitter and the supply substance.

SUMMARY OF THE INVENTION

The object of the present invention is to create an improved device of the above described type, wherein a contents check with a measuring unit is possible, which presupposes a smooth surface, such as is the case with self-leveling supply substances.

This object is achieved according to the present invention through providing at least one radial stationary flank member in the region of the container bottom, which has a plurality of openings for the transfer of the supply substance in the direction toward the receiver. The at least one radial stationary flank member is spaced apart from the container bottom at least in the region of the container center such that a stirring blade can be rotated, at least partially, under the stationary flank, i.e. under a portion of its length.

The configuration of the stationary flank, stirring blade and scraper permit the smoothing of the surface of the supply substance such that a reliable measurement of the level of the surface of the supply-substance in the container can take place even if the supply substance has a high rigidity or viscosity and is not self-leveling. Thus, the build-up of peak and valley formations on the surface of the supply substance is effectively prevented.

In preferred embodiments of the present invention the measuring unit comprises a signal transmitter/sensor combination, for example for sound or light signals, in particular in the upper container region in the center of the container, with signal emission taking place preferably symmetrically with respect to the rotational axis of the stirring blade. This avoids, or at least reduces, error reflections which could be caused by the scraping means of the stirring blade as well as errors caused by the absence of reflections which, are the result of a funnel formation in the container center during the emptying of a full container. Also avoided are errors caused by a level increase in the container center when filling the container from below.

If the signal transmitter/sensor combination is disposed on a preferably detachable container cover comprising, if appropriate, a signal opening, an especially simple mounting of the signal transmitter/sensor combination with ready accessibility of the interior of the container is ensured.

In order to decrease the danger of contamination of the signal transmitter/sensor combination, it is disposed so as to be recessed in a cavity of the measuring unit with the cavity being aligned with the signal opening.

An especially simple and functionally reliable structure of the device according to the present invention is attained if the axis of rotation of the stirring blade is disposed in parallel, preferably coaxially, with respect to the center axis of the container.

In a device according to the present invention, the stationary flank comprises a fastening part disposed in a peripheral region in the container as well as a resistance part extending tongue-like in the direction of the container center. The parts are matched to the shape of the stirring blade.

In a further preferred embodiment the particular radial stationary flank is implemented as a right-angled profile with upper surfaces and lower surfaces extending in parallel to the container bottom, which offers special efficiency as a scraping means.

A secure and simple fastening of the particular stationary flank in the container is attained so that the fastening part is detachably or nondetachably secured on the container bottom and/or on to the container wall.

A further improved smoothing of the supply substance surface is achieved by providing two or more stationary flanks that are disposed symmetrically with respect to the axis of rotation of the stirring blade. In the case of two stationary flanks, the flanks are offset, preferably by 180°, with respect to one another.

An even further improvement of the smoothing of the supply substance surface is attained by providing the scraping means with vertical and horizontal strap segments that are matched to the particular stationary flank and, if appropriate, to the container wall.

Increased functional reliability is additionally achieved by providing the measuring unit with a control and evaluation module with which a time-averaged value formation can take place over a number of discrete measurements. If the device is operated in such a manner, the effect of error measurements, due to an incomplete planar supply substance surface, can be corrected.

The signal sensors comprise a switching hysteresis in order to prevent the output signal from switching on and off about the switching point.

In order to achieve a supply substance surface of the greatest possible planarity even when the container is being filled and emptied, a plurality of openings are provided in the container bottom for filling and emptying.

Further goals, characteristics, advantages and application possibilities of the present invention will be evident based on the following description of exemplary embodiments in conjunction with the drawing. Therein all described and/or graphically illustrated characteristics by themselves or in any desired combination form the subject matter of the present invention even independently of their connection in individual claims or their reference back.

BRIEF DESCRIPTION OF THE DRAWING

The FIGURE is a cross sectional view of a supply substance delivery device.

DETAILED DESCRIPTION OF THE INVENTION

The sole FIGURE depicts a device according to the present invention with, for example, two radial stationary flanks 1 and one paddle-like stirring blade 2 having an associated scraping means 3 in a container 5 for containing a supply substance 8, such as lubricant, grease or the like. The container 5 can, as shown, be an integral part of a lubricating pump or be associated with another such consuming receiver 21 and terminate, via openings 18 in the region of the container bottom 9, in a suction chamber 20. The stationary flanks 1 are disposed so as to be offset from each other by 180° and are symmetrically located with respect to the axis of rotation D of the stirring blade 2 which axis coincides with the center axis M of container 5. The stirring blade projects radially outwardly from the center axis M, and is disposed above and in close proximity to the container bottom 9. The stirring blade 2 terminates at a distance in front of the center axis M, and has at least in the region adjacent to the center axis M a given distance from the container bottom 9. The stirring blade 2 extends at least partially under the stationary flank 1 at a given distance from the container bottom 9. A scraper or scraping means 3, which is rotatable with the stirring blade 2, extends with a vertical strap segment 19 between and through the stationary flanks 1, and with a horizontal strap segment 16 that is parallel to the container bottom 9 and the upper surface 13 of each stationary flank 1. The scraper 3 also has an adjoining further strap segment 17, which is parallel to the vertical container wall 6. The segment 17 extends up to approximately the upper end of container 5. Any supply substance 8, which is adhered on the stationary flanks 1 and the container wall 6, is scraped off with the aid of strap segments 16, 17 and 19. During rotation of the stirring blades 2 about the axis of rotation D, which is coaxial with the center axis M, the supply substance 8 is freed of air inclusions and supplied, via the openings 18, which are disposed about the axis of rotation D, to the suction chamber 20 or the like disposed underneath the container bottom 9.

During movement of the stirring blade 2, the supply substance 8 is pushed ahead of itself, against which the stationary flank 1 acts as a hindrance. Supply substance that has accumulated on the stationary flanks 1 is scraped off by means of the scraping means 3, which makes the distribution of the supply substance 8 in container 5 more uniform. This is especially facilitated due to the fact that the axis of rotation D of the stirring blade 2 is disposed parallel and preferably coaxially with respect to the center axis M of container 5 such that leveling of the supply substance surface 8a takes place.

The stationary flank 1, as shown in the FIGURE, comprises a fastening piece or fastener 14 disposed in an inner peripheral region 12 of the container 5 and a resistance part 15 extending in the form of a tongue in the direction of the container center. The resistance parts 15 are both rheologically matched to the stirring blade 2 in order to form an optimum resistance for the supply substance 8 moved by the stirring blade 2. In the illustrated embodiment, the fastener 14 is secured either detachably or nondetachably to the container bottom 9. However, the fastener 14 can also be disposed detachably or nondetachably on the vertical container wall 6. The particular stationary flank 1 is implemented as a right-angled profile with a horizontal upper edge 13 and a horizontal lower edge 13' with the stirring blade 2 being able to rotate in the center recess under the stationary flank 1.

The vertical strap segment 17 of the scraping means 3 is preferably disposed in an offset and parallel position with respect to the axis of rotation D on stirring blade 2 such that only a slight given distance from the stationary flank 1, in particular to the resistance part 15, is present. The horizontal strap segment 16 of the scraping means 3 extends in close proximity above the upper surface 13 of the stationary flank 1. In order to attain improved smoothing of the supply substance surface 8a, the scraping means 3 is disposed in an axially offset position with respect to the paddle-like stirring blade 2.

The cooperation of stirring blade 2 with stationary flanks 1 and scraping means 3, during rotational movement of the stirring blade 3, leads to a smoothing of the surface 8a of the supply substance 8. In this way measurement of the level of the supply substance surface 8a can take place by means of a measuring unit 22 comprising a signal transmitter/sensor combination 4, for example for sound or light signals. The measuring unit is disposed on the container cover 10, which is provided with a signal opening 11, and operates according to the principle of reflection, which is used for example in sounding devices and the like. Accordingly, the level of the supply substance surface 8a in container 5 can be determined by means of ultrasound relative to the signal transmitter/sensor combination 4, for example by measuring the echo transmission time. If the combination signal transmitter/sensor 4 is disposed in the upper container region 7 at the center of container 5 and emits a signal that is symmetrical to the container axis M and the axis of rotation D, disturbance effects of the scraping means 3 onto the reflection of the signals will be low. In order to counteract the danger through contamination, the signal transmitter/sensor combination 4 is disposed so as to be recessed in a cavity 23 of the measuring unit 22.

With these measures, disturbances, due to deviations from a planar supply substance surface 8a, can be decreased, which can occur during the emptying or filling of container 5 with supply substance 8. During an emptying operation a funnel-like depression can occur, and during a filling operation a partial elevation of the supply substance surface 8a can occur. In both cases temporary error reflections and corresponding disturbances in the measurement of the substance level can occur which, however, are avoided through the stated measures.

For further correction of error reflections, the measuring unit 22 can comprise a control and evaluation module by means of which a time-averaged value formation over a number of discrete measurements can be performed. In a subset of discrete measurements, error reflections can be tolerated without the accuracy of the total measurement being excessively reduced or unnecessary error messages being triggered. Moreover, in order to optimize the response behavior of the signal transmitter/sensor combination 4 and in order to prevent the sensor signal from switching on and off about the switching point, a switching hysteresis is provided.

LIST OF REFERENCE SYMBOLS

1 Stationary flank
2 Stirring blade
3 Scraping means
4 Signal transmitter/sensor combination
5 Container
6 Container wall
7 Upper container region
8 Supply substance
8a Supply substance surface
9 Container bottom
10 Container cover
11 Signal opening
12 Peripheral container region
13 Stationary flank upper edge
13' Stationary flank lower edge
14 Fastening part
15 Resistance part
16 First strap segment
17 Further strap segment
18 Openings
19 Third strap segment
20 Suction chamber
21 Consumer, lubricating pump
22 Measuring unit
23 Cavity
D Axis of rotation
M Center axis

What is claimed is:

1. A device for transferring a non-self-leveling supply substance to a receiver, said device comprising:
   a container having a container wall, a container bottom, and a plurality of openings in the container bottom;
   a rotatable stirring blade mounted in said container and being rotatable about an axis of rotation, said stirring blade being operable to free air inclusions in the supply substance upon rotation of said stirring blade therein;
   a scraping device, associated with said stirring blade, for scraping the supply substance adhered to the container wall;
   a measuring unit for measuring the fill level of the supply substance in the container; and
   at least one radial stationary flank structure spaced from the container bottom at least in the vicinity of the container center,
   wherein said stirring blade can be rotated under at least a portion of said radial stationary flank structure, and
   wherein said stationary flank, said stirring blade and said scrapping device are operable to provide a more uniform distribution of the supply substance in the container, thereby facilitating reliable measurement of the fill level of the supply substance in the container.

2. The device as claimed in claim 1, wherein said scrapping device comprises a first segment adapted to rotate directly above said radial stationary flank structure.

3. The device as claimed in claim 2, wherein said scrapping device further comprises a second segment connected to said first segment and adapted to rotate adjacent the container wall.

4. The device as claimed in claim 3, wherein the first segment is perpendicular relative to the axis of rotation and the second segment is parallel relative to the axis of rotation.

5. The device as claimed in claim 1, wherein said measuring unit comprises a signal transmitter/sensor combination for measuring the fill level of the supply substance based on a principle of reflection.

6. The device as claimed in claim 5, wherein the signal transmitter/sensor combination is disposed in an upper region of the container at the container center, wherein the signal transmitter/sensor combination is operable to emit a signal that is symmetrical relative to the axis of rotation.

7. The device as claimed in claim 5, wherein said container includes a container cover having a signal transmitting opening, and the signal transmitter/sensor combination is disposed on the container cover.

8. The device as claimed in claim 1, wherein said measuring unit comprises a signal transmitter/sensor combination mounted in a cavity of the container so as to be recessed from the container interior.

9. The device as claimed in claim 8, wherein the signal transmitter/sensor combination comprises a switching hysteresis.

10. The device as claimed in claim 1, wherein said measuring unit comprises a control and evaluation module by means of which a time-averaged value formation for a number of discrete measurements can be carried out.

11. The device as claimed in claim 1, wherein the container is cylindrical and the axis of rotation of the stirring blade is disposed in parallel or coaxially with a center axis of the container.

12. The device as claimed in claim 1, wherein said radial stationary flank structure comprises a fastening part disposed in a peripheral region of the container interior, and a resistance part extending in the direction of a center of the container.

13. The device as claimed in claim 12, wherein the fastening part said measuring unit is fastened to the container bottom and/or the container wall.

14. The device as claimed in claim 1, wherein said radial stationary flank structure has a right-angle profile with an upper surface and a lower surface that are parallel relative to the container bottom.

15. The device as claimed in claim 1, wherein said at least one radial stationary flank structure comprises at least two radial stationary flank structures that are offset by 180 degrees relative to the axis of rotation.

16. The device as claimed in claim 1, wherein said at least one radial stationary flank structure has an upper horizontal surface, and said scraping device has a segment that is parallel to the horizontal surface of the radial stationary flank structure.

17. The device as claimed in claim 1, wherein the container wall is vertical, and said scraping device includes a segment that is parallel to the vertical container wall.

18. The device as claimed in claim 16, wherein the scraping device comprises a vertical segment that is parallel to the axis of rotation of the stirring blade and is radially spaced from an inner end of said radial stationary flank structure.

19. A device for transferring a lubricant to a suction chamber of a lubricating pump, said device comprising:
- a container having a container wall, a container bottom, and a plurality of openings in the container bottom;
- a rotatable stirring blade mounted in said container and being rotatable about an axis of rotation, said stirring blade being operable to free air trapped in the lubricant upon rotation of said stirring blade therein;
- a scraping device, mounted on said stirring blade, for scraping off the lubricant that has adhered to the container wall;
- a measuring unit for measuring the upper level of the lubricant in the container; and
- at least one radial stationary flank structure disposed in the container and spaced from the container bottom at least in the vicinity of the container center,
- wherein said stirring blade can be rotated under at least a portion of said radial stationary flank structure, and
- wherein said radial stationary flank structure, said stirring blade and said scrapping device are operable to prevent a build-up of peak and valley formations on the surface of the lubricant thereby facilitating reliable measurement of the fill level of the supply substance in the container by said measuring unit.

20. The device as claimed in claim 19, wherein said measuring unit comprises a sound or light signal transmitter/sensor combination for measuring the fill level of the lubricant based on transmitted signals that are reflected from an upper surface of the lubricant and sensed by the signal transmitter/sensor combination.

* * * * *